United States Patent
Leu et al.

(10) Patent No.: US 6,875,561 B2
(45) Date of Patent: Apr. 5, 2005

(54) METHOD FOR MAKING POLYMER-BASED RARE EARTH-DOPED WAVEGUIDE

(75) Inventors: Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 210 days.

(21) Appl. No.: 10/138,741

(22) Filed: May 3, 2002

(65) Prior Publication Data

US 2003/0205555 A1 Nov. 6, 2003

(51) Int. Cl.$^7$ ................................................. G02B 6/10
(52) U.S. Cl. ..................... 430/321; 427/163.2; 385/143
(58) Field of Search ........................... 430/321; 216/24; 427/163.2; 385/142, 143

(56) References Cited

U.S. PATENT DOCUMENTS 5,581,398 A * 12/1996 van Veggel et al. ........ 359/342
6,538,805 B1 * 3/2003 Norwood et al. ......... 359/341.5

* cited by examiner

Primary Examiner—John A. McPherson
(74) Attorney, Agent, or Firm—Wei Te Chung

(57) ABSTRACT

A method for making a polymer-based rare earth-doped waveguide includes the steps of: providing a substrate (11); spin coating a polymer bottom cladding layer (12) on the substrate; spin coating a core layer (13) comprising a polymer and complex rare earth metal ions, which can be excited to produce a laser, on the bottom cladding layer; using a channel patterning technique with masking and ultraviolet (UV) radiation followed by etching to form at least one channel waveguide (14); and spin coating a polymer top cladding layer (15) over the at least one channel waveguide and exposed portions of the bottom cladding layer. The method includes improving the solubility of rare earth metal ions in a polymer matrix, by forming a complex of each rare earth metal ion with an organic compound. These complexes have higher solubility in a fluorinated polymer, compared with pure rare earth metal ions.

2 Claims, 4 Drawing Sheets

STEP 2

STAGE 1

STAGE 2

STAGE 3

STAGE 4

METHOD FOR MAKING POLYMER-BASED RARE EARTH-DOPED WAVEGUIDE

BACKGROUND OF THE INVENTION

1. Field of the Invention

The present invention relates generally to rare earth-doped optical amplifiers, and particularly to polymer-based rare earth-doped waveguides that can be used in erbium-doped waveguide amplifiers (EDWAs).

2. Description of Prior Art

Optical amplifiers increase the optical output power of an end-terminal system. They can also be used as repeaters, thus allowing increased distance between end-terminal equipment. Rare earth-doped amplifiers can be stimulated to produce a laser that has the same wavelength as that of incident light. Erbium-doped amplifiers are the most established and accepted rare earth-doped amplifiers.

A type of erbium-doped amplifier called an erbium-doped fiber amplifier (EDFA) is commonly used in transoceanic cable transmission, but is too expensive for use in high-density metropolitan area networks (MANs). Erbium-doped waveguide amplifiers (EDWAs) have many of the advantages of EDFAs, are more economical than EDFAs to use in MAN applications, and yield better price/performance ratios than EDFAs in MANs. An EDWA comprises an erbium-doped waveguide embedded in a glass substrate. The EDWA's similarity to an EDFA derives from its use of an erbium-doped waveguide as a gain medium.

One method for making an EDWA is the ion exchange method, which comprises two steps. In the first step, a glass substrate is prepared in which erbium oxide has been uniformly mixed. The second step is the ion exchange step, in which the glass substrate is immersed in an ion salt bath and the erbium ions are exchanged out of the substrate. Since the outer regions of the substrate are more likely to lose their erbium ions in this process than the inner regions, a density graded distribution of the erbium ions in the substrate results. Thus a tunnel waveguide buried several micrometers ($\mu$m) under the glass surface is created. The stability of the waveguide is assured by the glass covering.

Another method for making an EDWA uses sputtering depositions. A target having a suitable composition with regard to the desired composition of the core layer to be deposited is arranged opposite a substrate in a vacuum chamber. Argon and oxygen are then introduced, such that the pressure in the vacuum chamber is in the range of about 0.3 to 25 Pascals (Pa). Radio frequency (RF) power is applied to the target. The target is then bombarded by argon atoms, such that atoms and/or molecules of the target are emitted from the target and deposited on the substrate. This process is continued until the deposited layer has sufficient thickness.

Referring to FIG. 4, U.S. Pat. No. 5,982,973 discloses an erbium-doped planar optical waveguide. The waveguide comprises a substrate, a bottom layer formed on the substrate, an active guiding layer arranged on the bottom layer, and a top cladding layer arranged over the active guiding layer. The sputtering depositions method is used to create the active guiding layer and top cladding layer of the waveguide. The material for the active guiding layer and the top cladding layer is glass.

U.S. Pat. H 1,848 discloses a Z-propagating waveguide laser and amplifier device in which a rare earth-doped LiNbO$_3$ crystal is used as a waveguide substrate. The waveguide is formed in the LiNbO$_3$ crystal substrate, substantially parallel to the crystallographic Z-axis of the LiNbO$_3$ crystal substrate. A metal diffusion method is used to create the graded refractive index of the crystalline waveguide.

Unfortunately, the ion exchange method, the sputtering depositions method of U.S. Pat. No. 5,982,973 and the metal diffusion method of U.S. Pat. H 1,848 are all difficult to control, time-consuming and expensive. An improved method is desired to overcome the above problems in making optical amplifiers.

SUMMARY OF THE INVENTION

In view of the above, it is an object of the present invention to provide a method for making cheaper waveguides for optical amplifiers used in MAN applications.

It is also an object of the present invention to provide a method for making a waveguide which produces a desired laser at a reduced cost.

It is a further object of the present invention to provide a method for making a waveguide used in an optical amplifier that has a low signal to noise ratio, low polarization dependence on gain, and low crosstalk between DWDM channels.

In order to achieve the objects mentioned above, a method of the present invention for making a polymer-based rare earth-doped waveguide comprises the steps of: providing a substrate; spin coating a polymer bottom cladding layer on the substrate; spin coating a core layer comprising a polymer and complex rare earth metal ions, which can be excited to produce a laser, on the bottom cladding layer; using a channel patterning technique with masking and ultraviolet (UV) radiation followed by etching to form at least one channel waveguide; and spin coating a polymer top cladding layer over the at least one channel waveguide and exposed portions of the bottom cladding layer. The method includes improving the solubility of rare earth metal ions in a polymer matrix, by forming a complex of each rare earth metal ion with an organic compound. These complexes have higher solubility in a fluorinated polymer, compared with pure rare earth metal ions.

Other objects, advantages and novel features of the present invention will become more apparent from the following detailed description when taken in conjunction with the accompanying drawings, in which:

DETAILED DESCRIPTION OF PREFERRED EMBODIMENT OF THE INVENTION

Figure 1:
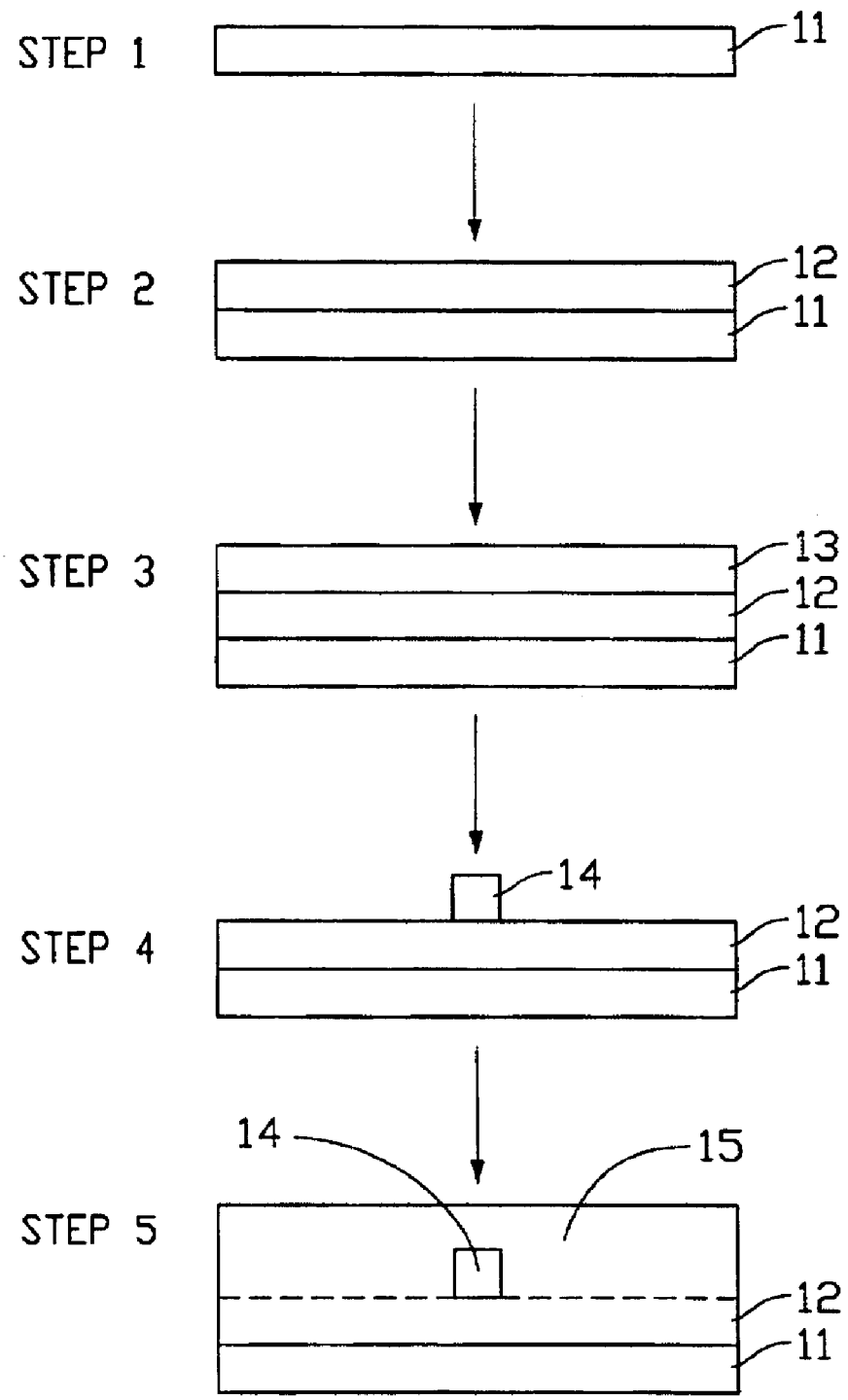
FIG. 1 is a schematic diagram of steps for making a polymer-based rare earth-doped waveguide in accordance with a preferred embodiment of the method of the present invention.

Referring to FIG. 1, a method of the present invention for making a polymer-based rare-earth doped waveguide comprises five steps as follows:

Step 1. Providing a silicon (Si) substrate 11.

Step 2. Spin coating a polymer bottom cladding layer 12 on the substrate 11.

Step 3. Spin coating a core layer 13 containing a polymer-rare earth metal ion complex on the bottom cladding layer 12.

Step 4. Forming channel waveguides 14 on the bottom cladding layer 12 by channel patterning followed by wet etching of the core layer 13.

Step 5. Spin coating a polymer top cladding layer 15 over the channel waveguides 14 and exposed portions of the bottom cladding layer 12.

Each of these steps is discussed in greater detail below.

The first step is providing a silicon substrate 11, that is, a wafer of crystalline silicon (Si). The silicon wafer is cut, polished, and cleaned according to standard industry practice, and has a top surface 111.

Figure 2:
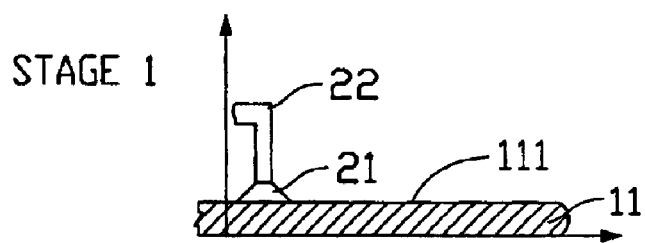
FIG. 2 is a schematic diagram of stages in a spin coating step, said step being part of the method illustrated in FIG. 1.
Figure 2:
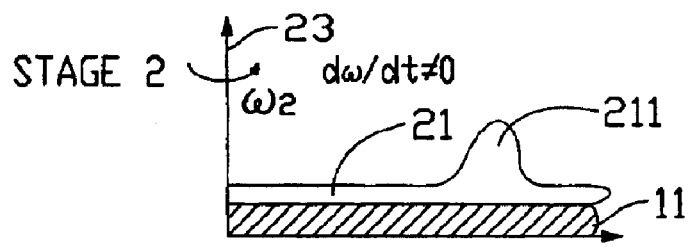
Figure 2:
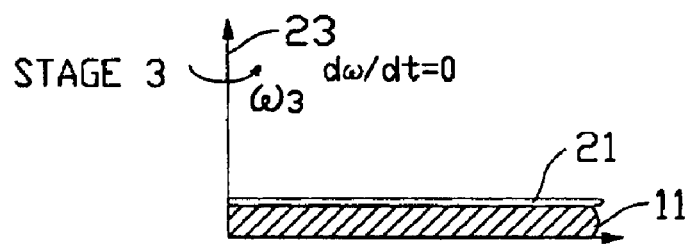
Figure 2:
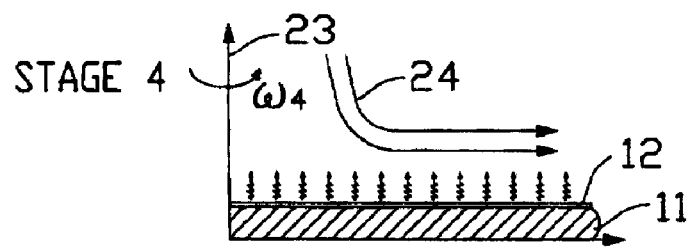

The second step, spin coating the bottom cladding layer 12 onto the substrate 11, is conducted in four stages as shown in FIG. 2. In the first stage, the top surface 111 of the substrate 11 is coated with a coating fluid 21 dispensed from a nozzle 22. The coating fluid 21 may, for example, be a fluorinated polymer. A substantial excess of coating fluid 21 is dispensed onto the top surface 111 compared to the amount that is ultimately required for the final coating. The coating fluid 21 completely covers the top surface 111.

In the second stage of the second step, the substrate 11 is rotated about an axis 23 that is perpendicular to the top surface 111 of the substrate 11. Rotation is started from stationary and is accelerated to a final, predetermined stage two rotation speed $\omega_2$. During acceleration, excess coating fluid 211 is expelled from the top surface 111. Initially, at lower speeds, spirals of excess coating fluid 211 appear on the coating fluid 21. As rotation speed increases, the coating fluid 21 becomes progressively thinner. When the rotation speed reaches $\omega_2$, the coating fluid 21 on the top surface 111 reaches an equilibrium. That is, components of the forces binding the remaining molecules of the coating fluid 21 to the surface 111 of the substrate 11 and directed inwardly toward the axis 23 are equal to the centripetal forces required to keep the molecules of the coating fluid 21 from leaving the substrate 11.

In the third stage of the second step, the substrate 11 is spun at a constant stage three rotation speed $\omega_3$. At this speed viscous forces of the coating fluid 21 dominate, and a thickness of the coating fluid 21 becomes generally uniform over the surface 111.

In the fourth stage of the second step, the substrate 11 is rotated at a stage four rotation speed $\omega_4$. The solvent is allowed to evaporate. Heaters (not shown) are used to heat the rotating top surface 111, and dry, clean, hot air 24 is blown over the top surface 111. When all four stages are complete, the bottom cladding layer 12 has been completed. A thickness of the bottom cladding layer 12 can be predetermined by choosing suitable polymer solution concentrations and molecular weights of the coating fluid 21, and by choosing suitable stage two, three and four rotation speeds $\omega_2$, $\omega_3$, $\omega_4$ of the substrate 11 about the axis 23.

The third step, spin coating a core layer 13 over the bottom cladding layer 12, generally comprises the same four stages as the second step. However, a solution containing a polymer and complex dopant ions is used instead of the coating fluid 21. To prepare such solution, an organic solution of an organic compound having a polydentate cage structure is used to enclose rare earth metal ions. Such organic compound may, for example, be a crown ether. A first alcoholic solution of the crown ether is prepared. A second alcoholic solution of chloride of selected rare earth metal ions is added into the first alcoholic solution drop by drop. The mixture is constantly stirred at 50 degrees Centigrade until it becomes a new transparent complex compound. An alkaline solution is added to give the resulting solution weak acidity. A solid is filtered out from the solution. The solid is recrystallized and purified to become a complex compound. The complex compound is then dissolved in the polymer. The desired solution containing the polymer and complex dopant ions can then be obtained. The dopant ions are chosen from a group of rare earth metal element ions capable of being excited to produce a laser, such as erbium (Er), thulium (Tm), holmium (Ho), praseodymium (Pr), samarium (Sm), cerium (Ce), ytterbium (Yb), neodymium (Nd), europium (Eu) and gadolinium (Gd). More than one of the group of rare earth metal element ions can be chosen for use in a same core layer 13. When the third step is completed, the core layer 13 containing the complex dopant ions covers the bottom cladding layer 12. A refractive index of the material used for making the core layer 13 is substantially greater than a refractive index of the material used for making the bottom cladding layer 12, and is also substantially greater than a refractive index of the material used for making the top cladding layer 15.

Figure 3:
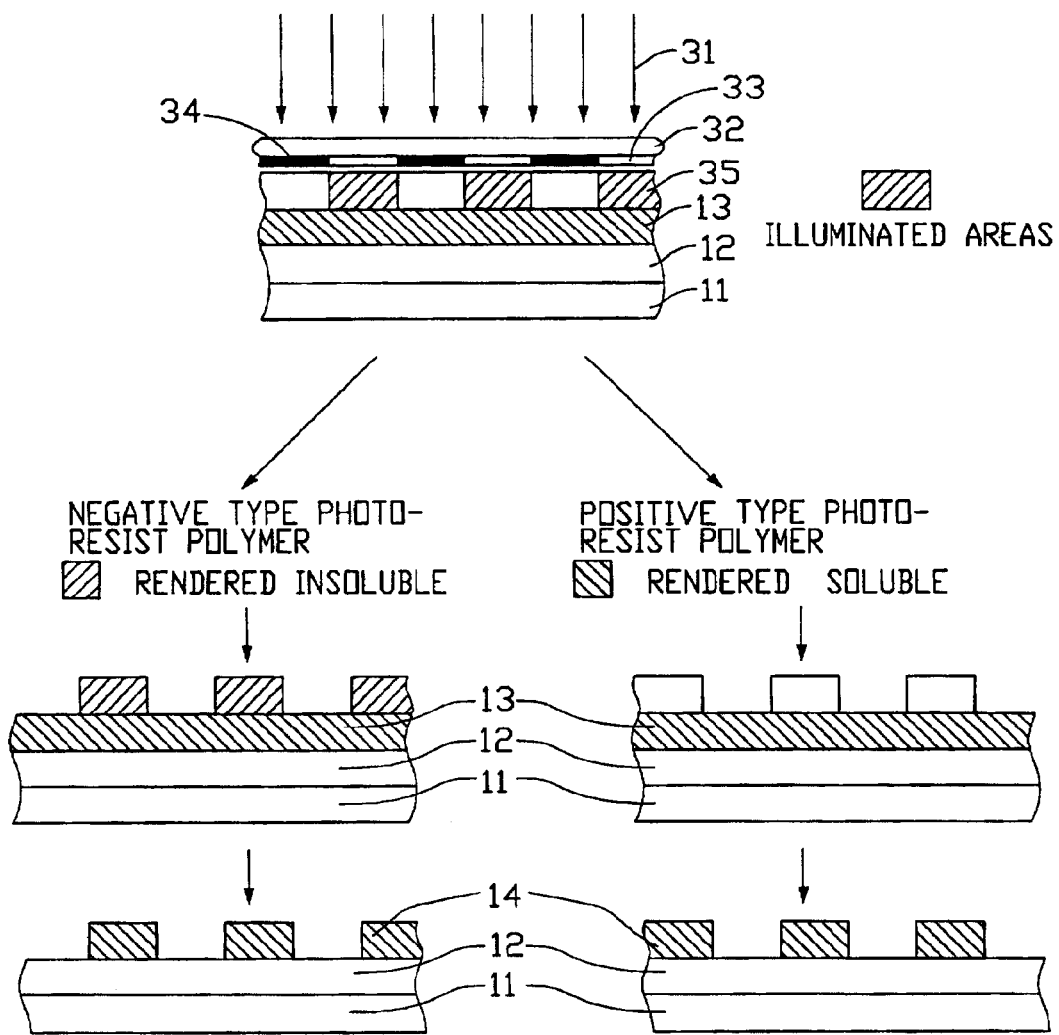
FIG. 3 is a schematic diagram of two alternative processes in a step for forming channel waveguides, said step being part of the method illustrated in FIG. 1.
Figure 4:
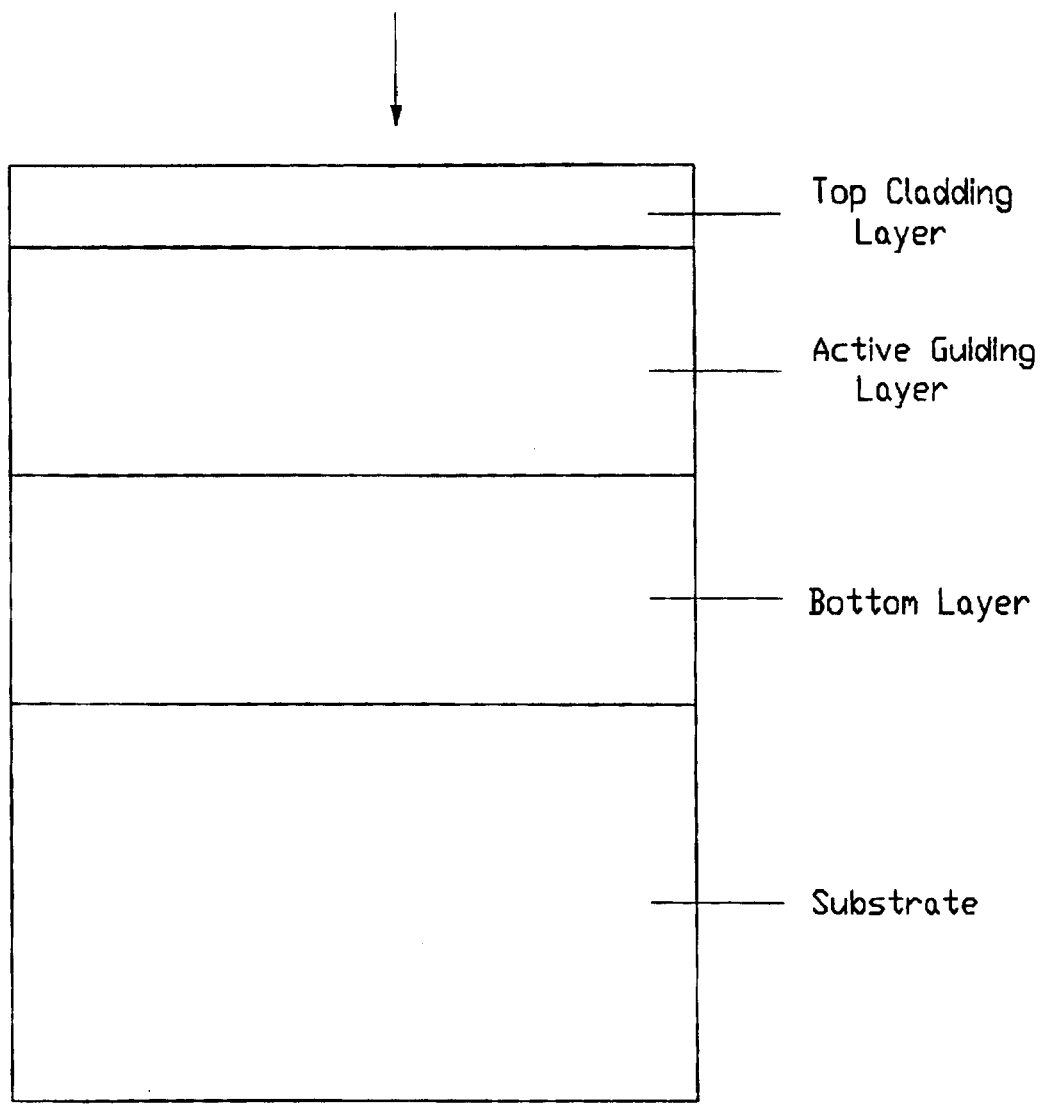
FIG. 4 is a cross-sectional view of a conventional planar optical waveguide device.

The fourth step, illustrated in FIG. 3, includes spin coating a photo-resistant polymer 35 on the core layer 13, overlaying the photo-resistant polymer 35 with a mask 32, irradiating the mask with ultraviolet (UV) radiation 31, and wet-etching a pattern of waveguides 14 into the core layer 13. The photo-resistant polymer 35 is spin coated over the core layer 13 in four stages. The four stages are similar to the four stages in the second step, except that a solution containing the photo-resistant polymer 35 is used instead of the coating fluid 21. The photo-resistant polymer 35 can be of a positive type such as polymethylmethacrylate (PMMA), or of a negative type such as Kodak Thin Film Resist (KTFR)(an azide-sensitized polyisoprene rubber). Examples and uses of both types of photo-resistant polymer 35 are well known. The positive type becomes more soluble after UV radiation. The negative type becomes less soluble after UV radiation. For example, if the photo-resistant polymer 35 is of the positive type, it is dissolved by Xylene more readily after UV radiation. If the photo-resistant polymer 35 is of the negative type, it is dissolved by one of the group comprising potassium hydroxide (KOH) solution, tetramethylammonium hydroxide (TMAH), ketones and acetates after radiation.

The mask 32 has photo-resistant parts 34 and photo-transparent parts 33. The mask 32 is laid over the photo-resistant polymer 35. In the preferred embodiment, a distance between the mask 32 and the photo-resistant polymer 35 is between 1 $\mu$m and 10 $\mu$m. The making and use of the mask 32 are well known. For example, the mask 32 can be prepared by exposing a photoresist overcoated silica mask-plate to an electron beam.

After the mask 32 is placed on the photo-resistant polymer 35, the entire mask 32 is irradiated with UV radiation 31. Port ions of the photo-resistant polymer 35 which are under photo-transparent parts 33 of the mask 32 are irradiated with UV radiation and undergo photo-chemical reaction. The said portions either become more soluble or less soluble in an etching solution, depending on whether the photo-resistant polymer 35 is of the positive or negative type. Following UV irradiation, the mask 32 is removed from the photo-resistant polymer 35.

The choice of etching solutions used also depends on whether the photo-resistant polymer 35 is of a positive or negative type. The choice of etching solutions used is also well known. A first wet-etching removes soluble portions of the photo-resistant polymer layer 35. A second wet-etching, using the same or a different solvent, removes exposed portions of the core layer 13. A third etching, using a different solvent, removes insoluble portions of the photo-resistant polymer layer 35. This sequence of steps leaves a pattern of channel waveguides 14 doped with the selected rare-earth ions on the bottom cladding layer 12.

The fifth step is spin coating a polymer top cladding layer 15 over the channel waveguides 14 and exposed portions of the bottom cladding layer 12. This step generally comprises four stages similar to the four stages of the second step.

Other modifications and adaptations of the above-described preferred embodiment of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A method for making a polymer-based waveguide device, the method comprising the steps of:

providing a substrate;

spin coating a polymer bottom cladding layer on said substrate;

spin coating a core layer on the bottom cladding layer, the core layer comprising a combination of a polymer and a quantity of rare earth ion complexes, each rare earth ion complex comprising an organic compound and a rare earth ion that can be excited to produce a laser;

channel patterning using radiation through a mask, and etching, to form at least one channel waveguide in the core layer; and spin coating a polymer top cladding layer to cover the at least one channel waveguide;

wherein the combination of the polymer and the quantity of rare earth ion complexes is prepared by dissolving an organic compound having a polydentate cage structure enclosing rare earth metal ions in the polymer, the rare earth metal ions being selected from the group consisting of samarium, cerium, and gadolinium; wherein the organic compound having the polydentate case structure is a crown ether.

2. A method of making a polymer-based waveguide device, comprising the steps of:

providing a substrate;

coating a polymer bottom cladding layer on the substrate;

coating a core layer on the polymer bottom cladding layer, said core layer including a combination of a polymer and a plurality of rare earth ion complexes, each of said rare earth ion complexes comprising a rare earth ion and a crown ether compound;

forming at least one channel waveguide in said core layer by removing some of said core layer; and coating a polymer top cladding layer on said at least one channel waveguide.

* * * * *